(12) United States Patent
Takahashi (10) Patent No.: US 7,981,475 B2
(45) Date of Patent: Jul. 19, 2011

(54) MANUFACTURING METHOD OF HONEYCOMB STRUCTURAL BODY, AND SEALING MATERIAL

(75) Inventor: Tomohisa Takahashi, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 874 days.

(21) Appl. No.: 10/518,548

(22) PCT Filed: Nov. 5, 2004

(86) PCT No.: PCT/JP2004/016444
§ 371 (c)(1),
(2), (4) Date: Jul. 11, 2006

(87) PCT Pub. No.: WO2005/045210
PCT Pub. Date: May 19, 2005

(65) Prior Publication Data
US 2007/0126160 A1 Jun. 7, 2007

(30) Foreign Application Priority Data

Nov. 5, 2003 (JP) .................................. 2003-376226

(51) Int. Cl.
*B05D 3/12* (2006.01)
(52) U.S. Cl. ...... 427/355; 264/102; 264/259; 264/297.2; 264/628; 425/113; 425/126.1; 427/172; 427/358; 427/389.7; 427/430.1; 118/404
(58) Field of Classification Search .................. 427/355; 264/628
See application file for complete search history.

(56) References Cited

U.S. PATENT DOCUMENTS 4,018,953 A * 4/1977 Martellock ................ 427/430.1

(Continued)

FOREIGN PATENT DOCUMENTS

CN 1437677 A 8/2003

(Continued)

OTHER PUBLICATIONS

U.S. Appl. No. 09/926,795.

(Continued)

*Primary Examiner* — Michael Kornakov
*Assistant Examiner* — Alexander Weddle
(74) *Attorney, Agent, or Firm* — Oblon, Spivak, McClelland, Maier & Neustadt, L.L.P.

(57) ABSTRACT

An object of the present invention is to provide a manufacturing method of a honeycomb structural body which makes the profile of a cross section perpendicular to the length direction thereof less likely to generate dispersion, and also makes the thickness of its sealing material layer thinner, and a sealing material that is suitably used in the manufacturing method of the honeycomb structural body. According to the present invention, the manufacturing method of a honeycomb structural body with a sealing material layer formed on the peripheral portion of a pillar-shaped porous honeycomb member includes a sealing material applying step of applying a paste-like sealing material, which is a raw material of the sealing material layer, onto a circumferential face of the pillar-shaped porous honeycomb member, and a scraping step of fitting a ring-shaped scraper, which can be brought into contact with the circumferential face of the pillar-shaped porous honeycomb member so as to slide thereon, to the pillar-shaped porous honeycomb member and moving said ring-shaped scraper in the length direction, thereby expanding the paste-like sealing material applied onto the circumferential face of the pillar-shaped porous honeycomb member so as to spread over the entire circumferential face of the pillar-shaped porous honeycomb member.

12 Claims, 5 Drawing Sheets

(a)

(b)

(c)

U.S. PATENT DOCUMENTS

| | | | |
|---|---|---|---|
| 4,454,833 A * | 6/1984 | McChesney et al. | 399/240 |
| 5,385,873 A * | 1/1995 | MacNeill | 501/95.1 |
| 5,914,187 A | 6/1999 | Naruse et al. | |
| 5,930,994 A | 8/1999 | Shimato et al. | |
| 6,447,564 B1 | 9/2002 | Ohno et al. | |
| 6,565,630 B2 | 5/2003 | Ohno et al. | |
| 6,669,751 B1 | 12/2003 | Ohno et al. | |
| 6,770,116 B2 | 8/2004 | Kojima | |
| 7,396,586 B2 | 7/2008 | Ohno et al. | |
| 7,449,427 B2 | 11/2008 | Ohno et al. | |
| 7,491,057 B2 | 2/2009 | Saijo et al. | |
| 7,498,544 B2 | 3/2009 | Saijo et al. | |
| 7,504,359 B2 | 3/2009 | Ogyu et al. | |
| 7,540,898 B2 | 6/2009 | Oshimi | |
| 7,611,764 B2 | 11/2009 | Komori et al. | |
| 7,662,458 B2 | 2/2010 | Ninomiya et al. | |
| 7,704,295 B2 | 4/2010 | Oshimi | |
| 7,731,774 B2 | 6/2010 | Ohno et al. | |
| 7,811,351 B2 | 10/2010 | Oshimi | |
| 2002/0100994 A1 * | 8/2002 | Sander | 264/102 |
| 2003/0104189 A1 | 6/2003 | Agata | |
| 2004/0031264 A1 | 2/2004 | Kojima | |
| 2004/0033175 A1 | 2/2004 | Ohno et al. | |
| 2004/0055265 A1 | 3/2004 | Ohno et al. | |
| 2004/0161596 A1 | 8/2004 | Taoka et al. | |
| 2004/0223892 A1 | 11/2004 | Kojima | |
| 2005/0011174 A1 | 1/2005 | Hong et al. | |
| 2005/0016140 A1 | 1/2005 | Komori et al. | |
| 2005/0016141 A1 | 1/2005 | Hong et al. | |
| 2005/0159310 A1 | 7/2005 | Ohno et al. | |
| 2005/0176581 A1 | 8/2005 | Ohno et al. | |
| 2005/0214504 A1 | 9/2005 | Yoshida | |
| 2005/0229565 A1 | 10/2005 | Yoshida | |
| 2005/0247038 A1 | 11/2005 | Takahashi | |
| 2005/0272602 A1 | 12/2005 | Ninomiya | |
| 2006/0019061 A1 | 1/2006 | Oshimi | |
| 2006/0021310 A1 | 2/2006 | Ohno et al. | |
| 2006/0029897 A1 | 2/2006 | Saijo et al. | |
| 2006/0029898 A1 | 2/2006 | Saijo et al. | |
| 2006/0043652 A1 | 3/2006 | Saijo et al. | |
| 2006/0051556 A1 | 3/2006 | Ohno et al. | |
| 2006/0059877 A1 | 3/2006 | Yoshida | |
| 2006/0108347 A1 | 5/2006 | Koyama et al. | |
| 2006/0118546 A1 | 6/2006 | Saijo | |
| 2006/0172113 A1 | 8/2006 | Kunieda | |
| 2006/0210765 A1 | 9/2006 | Ohno et al. | |
| 2006/0216466 A1 | 9/2006 | Yoshida | |
| 2006/0216467 A1 | 9/2006 | Yoshida | |
| 2006/0222812 A1 | 10/2006 | Koyama et al. | |
| 2006/0225390 A1 | 10/2006 | Yoshida | |
| 2006/0228521 A1 | 10/2006 | Ohno et al. | |
| 2006/0230732 A1 | 10/2006 | Kunieda | |
| 2006/0254231 A1 | 11/2006 | Hayashi et al. | |
| 2006/0269722 A1 | 11/2006 | Yamada | |
| 2007/0020155 A1 | 1/2007 | Ohno et al. | |
| 2007/0037703 A1 * | 2/2007 | Muroi | 502/439 |
| 2007/0068128 A1 | 3/2007 | Oshimi et al. | |
| 2007/0085233 A1 | 4/2007 | Yamada | |
| 2007/0116908 A1 | 5/2007 | Ohno et al. | |
| 2007/0128405 A1 | 6/2007 | Sakaguchi et al. | |
| 2007/0130897 A1 | 6/2007 | Sakaguchi et al. | |
| 2007/0144561 A1 | 6/2007 | Saijo et al. | |
| 2007/0148403 A1 | 6/2007 | Yamamura et al. | |
| 2007/0152382 A1 | 7/2007 | Yamada et al. | |
| 2007/0169453 A1 | 7/2007 | Hayakawa | |
| 2007/0175060 A1 | 8/2007 | Idei et al. | |
| 2007/0178275 A1 | 8/2007 | Takahashi | |
| 2007/0187651 A1 | 8/2007 | Naruse et al. | |
| 2007/0190289 A1 | 8/2007 | Fujita | |
| 2007/0190350 A1 | 8/2007 | Ohno et al. | |
| 2007/0196620 A1 | 8/2007 | Ohno et al. | |
| 2007/0199205 A1 | 8/2007 | Hoshino et al. | |
| 2007/0199643 A1 | 8/2007 | Kawai et al. | |
| 2007/0204580 A1 | 9/2007 | Kunieda | |
| 2007/0212517 A1 | 9/2007 | Ohno et al. | |
| 2007/0235895 A1 | 10/2007 | Yamamura et al. | |
| 2007/0243283 A1 | 10/2007 | Yamamura et al. | |
| 2007/0262497 A1 | 11/2007 | Yamamura et al. | |
| 2007/0262498 A1 | 11/2007 | Saijo et al. | |
| 2007/0277655 A1 | 12/2007 | Kawai et al. | |
| 2007/0293392 A1 | 12/2007 | Ohno et al. | |
| 2008/0006971 A1 | 1/2008 | Kawai et al. | |
| 2008/0067725 A1 | 3/2008 | Naruse et al. | |
| 2008/0083202 A1 | 4/2008 | Kunieda et al. | |
| 2008/0084010 A1 | 4/2008 | Naruse et al. | |
| 2008/0088072 A1 | 4/2008 | Kobayashi | |
| 2008/0106008 A1 | 5/2008 | Kasai et al. | |
| 2008/0106009 A1 | 5/2008 | Naruse et al. | |
| 2008/0111274 A1 | 5/2008 | Kawai et al. | |
| 2008/0115597 A1 | 5/2008 | Ohno et al. | |
| 2008/0116200 A1 | 5/2008 | Kawai et al. | |
| 2008/0116601 A1 | 5/2008 | Naruse et al. | |
| 2008/0120950 A1 | 5/2008 | Ohno et al. | |
| 2008/0136053 A1 | 6/2008 | Kuribayashi et al. | |
| 2008/0136062 A1 | 6/2008 | Kasai et al. | |
| 2008/0150200 A1 | 6/2008 | Tajima | |
| 2008/0157445 A1 | 7/2008 | Kawai et al. | |
| 2008/0160249 A1 | 7/2008 | Makino | |
| 2008/0174039 A1 | 7/2008 | Saijo et al. | |
| 2008/0179781 A1 | 7/2008 | Iwata | |
| 2008/0197544 A1 | 8/2008 | Saijo et al. | |
| 2008/0211127 A1 | 9/2008 | Naruse et al. | |
| 2008/0213485 A1 | 9/2008 | Shibata | |
| 2008/0236115 A1 | 10/2008 | Sakashita | |
| 2008/0236122 A1 | 10/2008 | Ito | |
| 2008/0236724 A1 | 10/2008 | Higuchi | |
| 2008/0237428 A1 | 10/2008 | Kobayashi et al. | |
| 2008/0237942 A1 | 10/2008 | Takamatsu | |
| 2008/0241015 A1 | 10/2008 | Kudo et al. | |
| 2008/0241444 A1 | 10/2008 | Oshimi | |
| 2008/0241466 A1 | 10/2008 | Saito et al. | |
| 2008/0251977 A1 | 10/2008 | Naruse et al. | |
| 2008/0284067 A1 | 11/2008 | Naruse et al. | |
| 2008/0305259 A1 | 12/2008 | Saijo | |
| 2008/0318001 A1 | 12/2008 | Sakakibara | |
| 2009/0004431 A1 | 1/2009 | Ninomiya | |
| 2009/0079111 A1 | 3/2009 | Kasai et al. | |
| 2009/0107879 A1 | 4/2009 | Otsuka et al. | |
| 2009/0130378 A1 | 5/2009 | Imaeda et al. | |
| 2009/0199953 A1 | 8/2009 | Sato | |
| 2009/0202402 A1 | 8/2009 | Sato | |
| 2009/0220735 A1 | 9/2009 | Mizuno et al. | |
| 2009/0238732 A1 | 9/2009 | Ohno | |
| 2009/0242100 A1 | 10/2009 | Saijo | |
| 2009/0243165 A1 | 10/2009 | Hiroshima | |
| 2009/0252906 A1 | 10/2009 | Higuchi | |

FOREIGN PATENT DOCUMENTS

| | | | |
|---|---|---|---|
| EP | 0 295 343 A1 | 12/1988 | |
| EP | 0 449 556 | 10/1991 | |
| EP | 449556 A2 * | 10/1991 | |
| JP | 62-220571 | 9/1987 | |
| JP | 2000-5671 | 1/2000 | |
| JP | 2000-102709 | 4/2000 | |
| JP | 2002-070545 | 3/2002 | |
| JP | 2002-95911 | 4/2002 | |
| JP | 2002-161726 | 6/2002 | |
| JP | 2003-192465 | 7/2003 | |
| JP | 2004290766 A * | 10/2004 | |

OTHER PUBLICATIONS

U.S. Appl. No. 10/129,126.
U.S. Appl. No. 10/507,375.
U.S. Appl. No. 10/502,045, filed Jan. 10, 2005, Kudo et al.
U.S. Appl. No. 10/502,054, filed Nov. 12, 2004, Kudo et al.
U.S. Appl. No. 10/506,438, filed Sep. 2, 2004, Taoka et al.
U.S. Appl. No. 10/502,044, filed Jan. 24, 2005, Taoka et al.
U.S. Appl. No. 10/504,987, filed Aug. 19, 2004, Kojima.
U.S. Appl. No. 10/508,415, filed Sep. 21, 2004, Shibata.
U.S. Appl. No. 10/510,344, filed Oct. 6, 2004, Ohno.
U.S. Appl. No. 10/506,247, filed Sep. 9, 2004, Kudo.
U.S. Appl. No. 10/509,578, filed Sep. 29, 2004, Yamada.
U.S. Appl. No. 10/509,688, filed Oct. 12, 2004, Yamada.
U.S. Appl. No. 10/986,227, filed Nov. 12, 2004, Ono et al.
U.S. Appl. No. 10/513,798, filed Nov. 18, 2004, Kunieda et al.

U.S. Appl. No. 10/515,179, filed Nov. 26, 2004, Yamada.
U.S. Appl. No. 10/515,181, filed Nov. 26, 2004, Komori et al.
U.S. Appl. No. 10/514,560, filed Nov. 30, 2004, Ohno et al.
U.S. Appl. No. 10/516,328, filed Dec. 14, 2004, Komori et al.
U.S. Appl. No. 10/518,373, filed Dec. 28, 2004, Ohno et al.

U.S. Appl. No. 11/033,151, filed Jan. 12, 2005, Ohno et al.
U.S. Appl. No. 10/521,592, filed Jan. 18, 2005, Ohno et al.

* cited by examiner

Fig.1

PRIOR ART

MANUFACTURING METHOD OF HONEYCOMB STRUCTURAL BODY, AND SEALING MATERIAL

TECHNICAL FIELD

The present invention relates to a manufacturing method of a honeycomb structural body that is used as a filter for removing particulates and the like contained in exhaust gases discharged from an internal combustion engine and a sealing material used for manufacturing the honeycomb structural body.

BACKGROUND ART

Recently, particulates contained in exhaust gases that are discharged from internal combustion engines of vehicles, such as cars, buses and trucks, and construction machines, have raised serious problems as those particulates are harmful to the environment and the human body. Conventionally, various honeycomb structural bodies (honeycomb filters), which allow exhaust gases to pass through porous ceramics to collect particulates in the exhaust gases so that the exhaust gases are purified, have been proposed.

Figure 1:
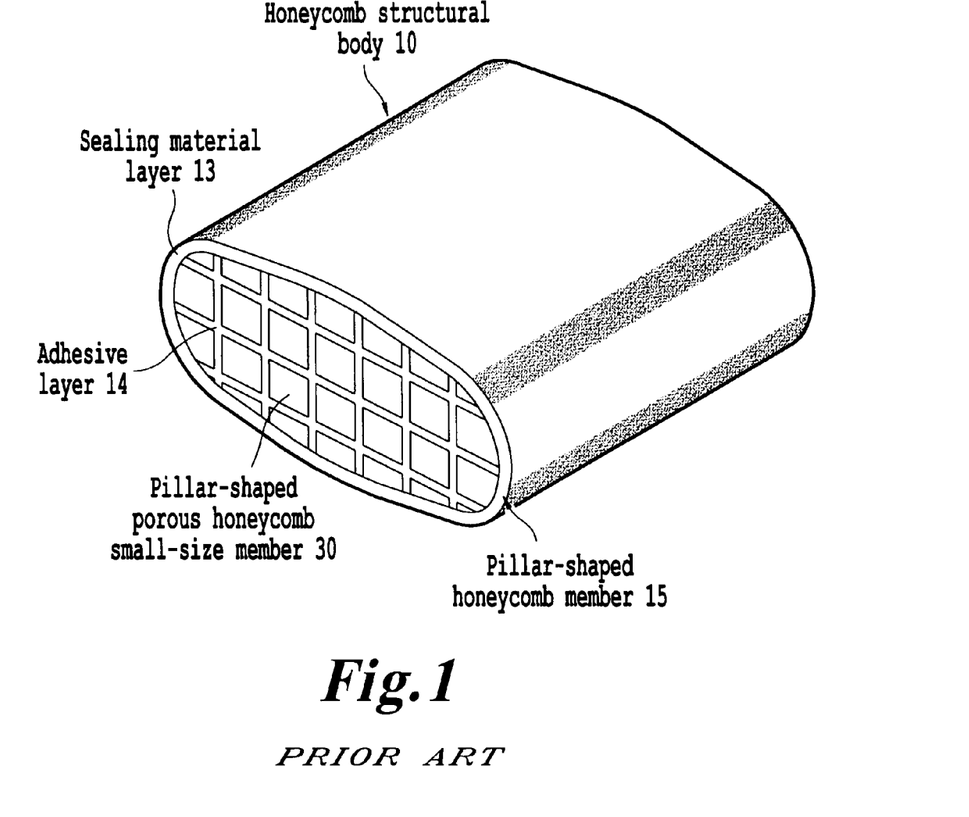
FIG. 1 is a perspective view that schematically shows one example of a honeycomb structural body.
Figure 2A:
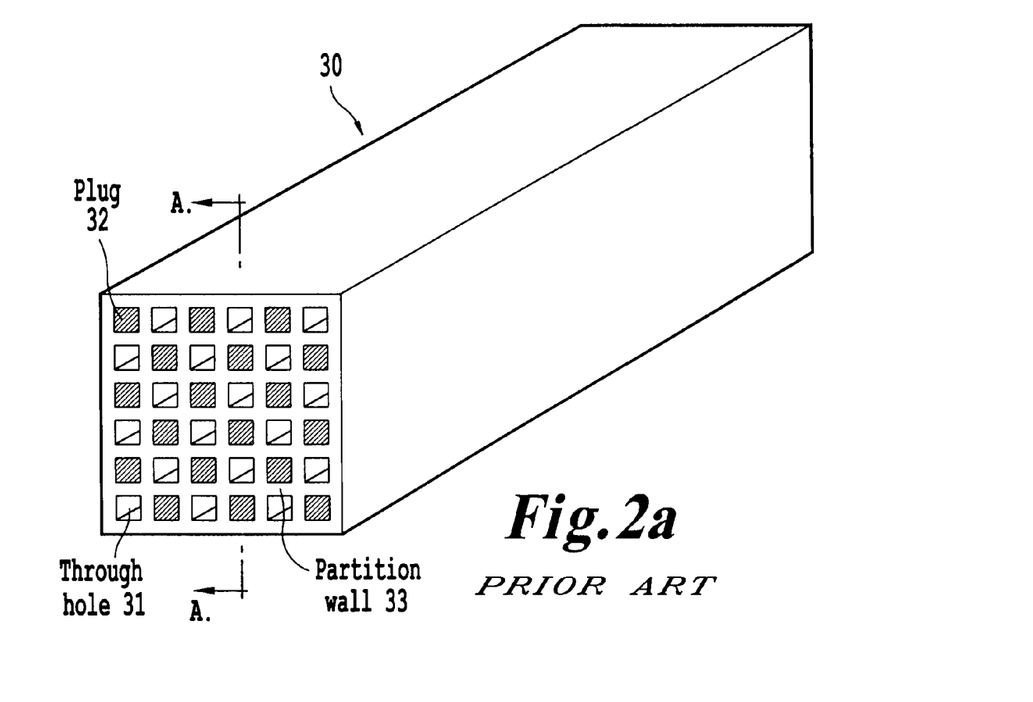
FIG. 2(a) is a perspective view that schematically shows one example of a pillar-shaped porous small-size member that forms the honeycomb structural body shown in FIG. 1.

FIG. 1 is a perspective view that schematically shows one example of a honeycomb structural body. FIG. 2(a) is a perspective view that schematically shows a pillar-shaped porous honeycomb small-size member used for forming the honeycomb structural body shown in FIG. 1, and FIG. 2(b) is a cross-sectional view taken along line A-A of FIG. 2(a).

As shown in FIG. 1, the honeycomb structural body 10 has a structure in which a plurality of pillar-shaped porous honeycomb small-size members 30, made from a ceramic material such as silicon carbide and the like, are combined with one another through adhesive layers 14 to form a pillar-shaped porous honeycomb member 15 with a sealing material layer 13 being formed on the circumference of the pillar-shaped porous honeycomb member 15.

Figure 2B:
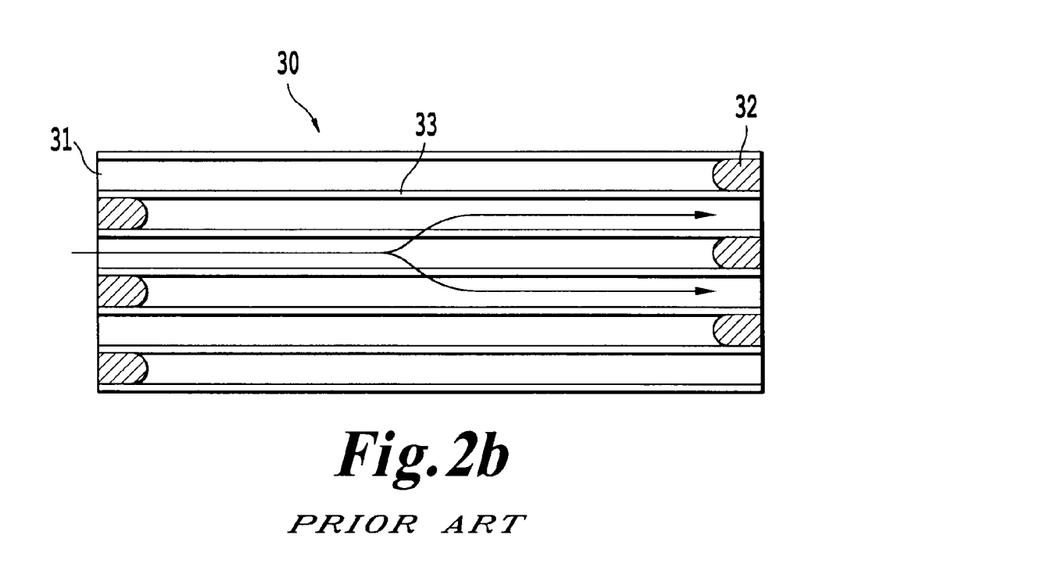
FIG. 2(b) is a cross-sectional view taken along line A-A of the pillar-shaped porous small-size member shown in FIG. 2(a).

As shown in FIG. 2, the pillar-shaped porous honeycomb small-size member 30 has a structure in which a number of through holes 31 are placed side by side in the length direction and partition wall 33, which separates the through holes 31 from each other, are allowed to serve as a filter. In other words, as shown in FIG. 2(b), each of the through holes 31 that are formed in the pillar-shaped porous honeycomb small-size member 30 is sealed with a plug 32 at either one of ends on its exhaust gas inlet side or exhaust gas outlet side so that exhaust gases that have entered one through hole 31 are discharged from another through hole 31 after having always passed through a partition wall 33 that separates the through holes 31. Here, arrows in FIG. 2(b) indicate flows of exhaust gases.

When an exhaust gas purifying device, provided with the honeycomb structural body 10 having such a structure, is placed in an exhaust passage in an internal combustion engine, particulates in exhaust gases discharged from the internal combustion engine are captured by the partition wall 33 when passing through the honeycomb structural body 10 so that the exhaust gases are purified.

The sealing material layer 13 is placed so as to adjust the shape of a honeycomb structural body 10, prevent exhaust gases from leaking through the peripheral portion of the honeycomb structural body 10 and improve the heat-insulating property of the honeycomb structural body 10, when the honeycomb structural body 10 is placed in an exhaust passage in an internal combustion engine.

Figures 5A, 5B, 5C:
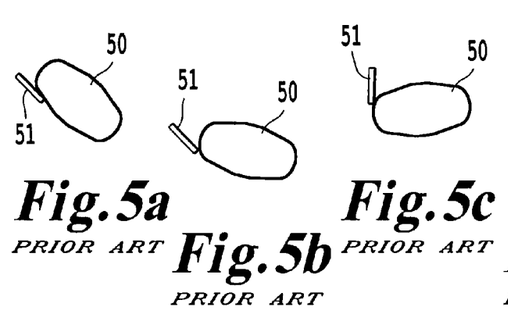
FIG. 5 is an explanatory view that schematically shows one example of a process in which a sealing material past layer is formed on the peripheral portion of a conventional pillar-shaped porous honeycomb member.
Figure 5D:
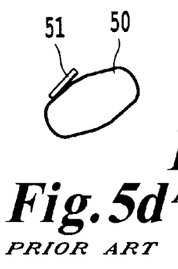
Figure 5E:
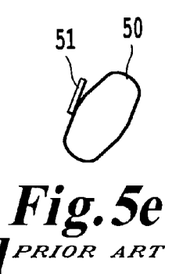
Figure 6:
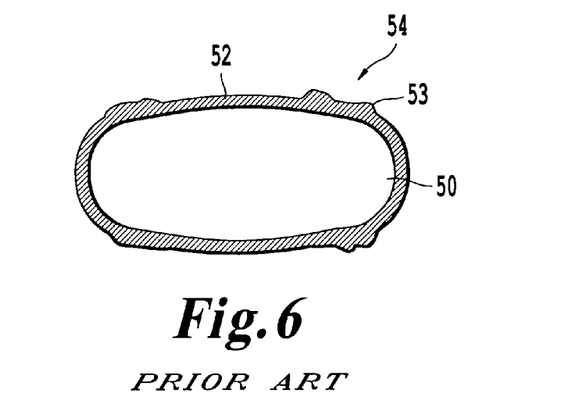
FIG. 6 is an explanatory view that schematically shows a state of a sealing material layer of a conventional honeycomb structural body.

FIG. 5 is an explanatory view that schematically shows one example of a conventional process in which a sealing material paste layer is formed on the periphery of a pillar-shaped porous honeycomb member. Moreover, FIG. 6 is an explanatory view that schematically shows a state of a sealing material layer in the conventional honeycomb structural body.

Conventionally, in order to form a sealing material layer 52 on the periphery of a pillar-shaped porous honeycomb member 50, first, the pillar-shaped porous honeycomb member 50 is supported at the axis in the length direction, and while the pillar-shaped porous honeycomb member 50 is being rotated around the axis in the length direction, paste-like sealing material, which forms a material for the sealing material layer 52, is adhered to the peripheral face of the pillar-shaped porous honeycomb member 50.

Next, as shown in FIGS. 5(a) to 5(e), a plate-shaped scraper 51, which is arranged so as to have a fixed angle and an interval with respect to the circumferential face of the rotating pillar-shaped porous honeycomb member 50, is used for forming the sealing material paste layer, and in this case, the scraper 51 is pressed onto the paste-like sealing material so that the paste-like sealing material is expanded with an almost uniform thickness over the entire circumferential face to form a sealing material paste layer. Lastly, the sealing material paste layer, thus formed, is dried and solidified (see Patent Documents 1 and 2).

However, in the case when the sealing material layer 52 is formed on the periphery of the pillar-shaped porous honeycomb member 50 in this method, the external dimension of the honeycomb structural body 54 thus manufactured tends to fail to strictly coincide with the designed dimension, and, for example, in the case of a pillar-shaped honeycomb structural body 54, the profile of a cross section perpendicular to the length direction tends to disperse depending on respective cross sections. One of the reasons for this problem is that, when, after almost forming a sealing material paste layer on the circumferential face of a pillar-shaped porous honeycomb member 50 by using a plate-shaped scraper 51, the plate-shaped scraper 51 is separated from the circumferential face, a protruding separation trace 53 is undesirably formed on one portion of the sealing material layer 52, as shown in FIG. 6, due to high viscosity of the paste-like sealing material. Another reason for this problem is that, when a honeycomb structural body 54 having a shape other than a cylindrical shape is manufactured, the plate-shaped scraper 51 needs to be moved following the rotation of the pillar-shaped porous honeycomb member 50 so as to maintain a fixed angle and interval with respect to the peripheral face of the pillar-shaped honeycomb member 50; thus, the pressing force of the plate-shaped scraper 51 onto the circumferential face becomes uneven to cause irregularities in the thickness of the sealing material layer 52.

It has been found that the dispersion in the external dimension of the honeycomb structural body is easily generated when there are parallel grooves (irregularities) in the length direction on the peripheral portion of the pillar-shaped porous honeycomb member on which the sealing material past layer is formed. Moreover, regarding a honeycomb structure formed by combining a plurality of pillar-shaped porous honeycomb small-size members with one another, since it is difficult to form a pillar-shaped porous honeycomb member having the same shape over the entire circumferential face due to: unevenness in the thickness of the sealing material located between the pillar-shaped porous honeycomb small-size members; and warps and the like of the pillar-shaped porous honeycomb small-size members, the dispersion in the external dimension of the honeycomb structural body tends to occur more frequently.

In the case when the honeycomb structural body has dispersion in the profile as described above, the surface pressure of the honeycomb structural body becomes uneven when it is placed in an exhaust passage in an internal combustion engine through a holding sealing member made from heat-insulating fibers and the like, to cause a failure in firmly securing the honeycomb structural body in the exhaust passage and the subsequent deviation of the honeycomb structural body when exhaust gases are allowed to pass through it.

Here, in the honeycomb structural body, the sealing material layer normally is a portion that is less likely to pass exhaust gases through, in comparison with the pillar-shaped porous honeycomb member; therefore, when the honeycomb structural body is used as an exhaust gas purifying device, it has been necessary to make the thickness of the sealing material layer thinner in order to reduce the pressure loss.

Moreover, when the honeycomb structural member is used as a filter for an exhaust gas purifying device and the like, it is put into a metal case through a heat-insulating member made from ceramic fibers and the like, and heated to high temperatures. At this time, since the honeycomb structural body tends to cause a temperature difference in the length direction, it results in a problem that cracks occur in the sealing material layer due to the difference in coefficients of thermal expansion in the honeycomb structural body.

Patent Document 1
JP-A 2000-5671
Patent Document 2
JP-A 2000-102709

DISCLOSURE OF THE INVENTION

Problems to be Solved by the Invention

The present invention has been devised to solve the above-mentioned problems, and its object is to provide a manufacturing method of a honeycomb structural body which, upon manufacturing a honeycomb structural body having a sealing material layer formed on the peripheral portion of a pillar-shaped porous honeycomb member, prevents dispersion in the profile of a cross section perpendicular to the length direction, and makes the thickness of the sealing material layer thinner, and a sealing material that is desirably used for such a manufacturing method of a honeycomb structural body.

Means for Solving the Problems

A manufacturing method of a honeycomb structural body according to a first aspect of the present invention is a manufacturing method of a honeycomb structural body with a sealing material layer formed on a peripheral portion of a pillar-shaped porous honeycomb member, comprising: a sealing material applying step of applying a paste-like sealing material, which is a raw material of the sealing material layer, onto a circumferential face of the pillar-shaped porous honeycomb member; and a scraping step of fitting a ring-shaped scraper, which can be brought into contact with the circumferential face of the pillar-shaped porous honeycomb member so as to slide thereon, to the pillar-shaped porous honeycomb member and moving said ring-shaped scraper in the length direction, thereby expanding the paste-like sealing material applied onto the circumferential face of the pillar-shaped porous honeycomb member so as to spread over the entire circumferential face of the pillar-shaped porous honeycomb member.

In the manufacturing method according to the first aspect of the present invention, desirably used is a pillar-shaped porous honeycomb member having a cross-sectional shape perpendicular to the length direction that is other than a round shape.

A sealing material according to a second aspect of the present invention is used in the manufacturing method of a honeycomb structural body according to first aspect of the present invention, which has a viscosity in a range from 15 to 45 Pa·s.

A sealing material according to a third aspect of the present invention is used upon manufacturing a honeycomb structural body with a sealing material layer formed on a peripheral portion of a pillar-shaped porous honeycomb member, comprising: an inorganic filler; and an inorganic binder, wherein the inorganic filler has an aspect ratio in a range from 1.01 to 10.00.

Effects of the Invention

In the manufacturing method of a honeycomb structural body according to the first aspect of the present invention, upon forming a sealing material layer on the peripheral portion of a pillar-shaped porous honeycomb member, the surface of the sealing material layer prior to a curing process is formed by using a ring-shaped scraper capable of contacting the circumferential face of the pillar-shaped porous honeycomb member so as to slide thereon; therefore, it is possible to prevent a protruding separation trace from being formed on one portion of the sealing material layer on the circumferential face, and also to prevent dispersion in the thickness of the sealing material layer from occurring due to unevenness of the pressing force by the scraper; consequently, it becomes possible to manufacture a honeycomb structural body that is less likely to generate dispersion on the profile of the cross section perpendicular to the length direction, with a superior assembling property.

Moreover, in the manufacturing method of a honeycomb structural body according to the first aspect of the present invention, by adjusting the difference between the outer diameter of the pillar-shaped porous honeycomb member and the inner diameter of the ring-shaped scraper, the thickness of the sealing material layer can be made thinner; therefore, it becomes possible to make the aperture ratio of the two end faces of the resulting honeycomb structural body greater, and consequently to reduce the pressure loss when the resulting honeycomb structural body is placed in an exhaust passage in an internal combustion engine.

Furthermore, in the manufacturing method of a honeycomb structural body according to the first aspect of the present invention, even when a pillar-shaped porous honeycomb member having a cross-sectional shape perpendicular to the length direction that is other than a round shape is used, it is possible to manufacture a honeycomb structural body that is less likely to generate dispersion on the profile of the cross section perpendicular to the length direction, with a superior assembling property.

In a sealing material according to the second aspect of the present invention, since the viscosity of the sealing material is set in a range from 15 to 45 Pa·s, the sealing material can be expanded to spread as a very thin film over the entire circumferential face of the pillar-shaped porous honeycomb member by the scraper; therefore, it is possible to manufacture a honeycomb structural body which is less likely to generate dispersion on the profile of the cross section perpendicular to the length direction, with a superior assembling property, and has a reduced pressure loss when it is placed in an exhaust passage in an internal combustion engine.

According to the third aspect of the present invention, by adjusting the coating method and orienting the inorganic filler, it is possible to provide a sealing material layer having superior thermal conductivity in the oriented direction, and consequently to manufacture a honeycomb structural body that is less likely to generate cracks, and has superior durability. Moreover, since viscosity can be adjusted to an appropriate range, it is possible to easily form a sealing material layer that is thin with an even thickness and is superior in handling property.

BEST MODE FOR CARRYING OUT THE INVENTION

According to the first aspect of the present invention, a manufacturing method of a honeycomb structural body with a sealing material layer formed on a peripheral portion of a pillar-shaped porous honeycomb member comprises: a sealing material applying step of applying a paste-like sealing material, which is a raw material of the sealing material layer, onto a circumferential face of the pillar-shaped porous honeycomb member; and a scraping step of fitting a ring-shaped scraper, which can be brought into contact with the circumferential face of the pillar-shaped porous honeycomb member so as to slide thereon, to the pillar-shaped porous honeycomb member and moving said ring-shaped scraper in the length direction, thereby expanding the paste-like sealing material applied onto the circumferential face of the pillar-shaped porous honeycomb member so as to spread over the entire circumferential face of the pillar-shaped porous honeycomb member.

Figure 3:
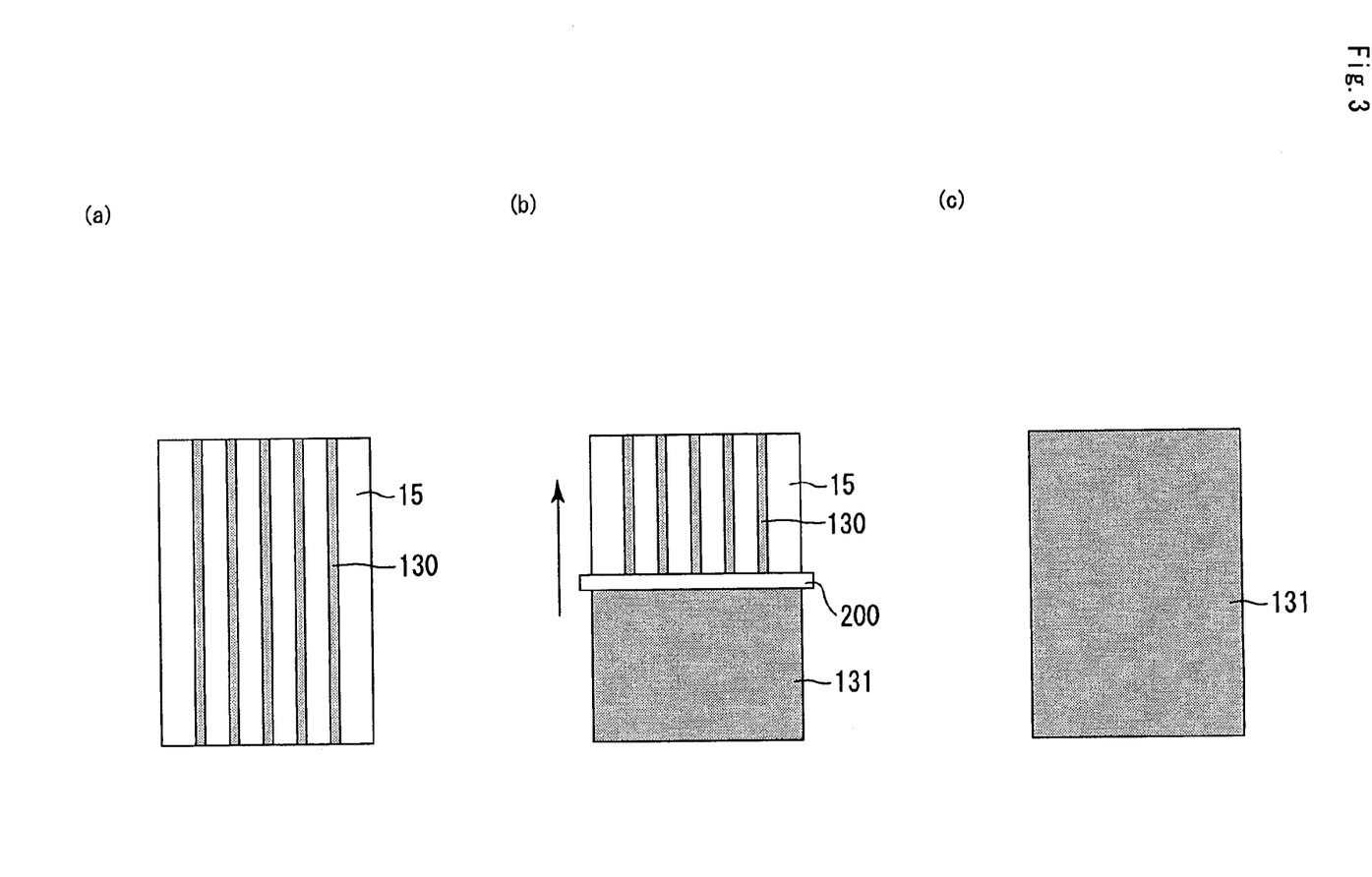
FIG. 3 is a flowchart that schematically shows a coating material applying step and a scraping step in a manufacturing method of the honeycomb structural body of the present invention.

FIG. 3 is a flowchart that schematically shows the sealing material applying step and the scraping step in the manufacturing method of a honeycomb structural body according to the first aspect of the present invention.

Referring to FIGS. 1 to 3 based on demand, the following description will discuss the first aspect of the present invention. The sealing material applying step and the scraping step are first explained, and the pillar-shaped porous honeycomb member on which the sealing material layer is formed is then explained.

In the manufacturing method of a honeycomb structural body according to the first aspect of the present invention, first, the sealing material applying step is carried out.

In the sealing material applying step, as shown in FIG. 3(a), a paste-like sealing material 130, which serves as a material for a sealing material layer 13, is adhered to the circumferential face of a pillar-shaped porous honeycomb member 15.

With respect to the method for adhering the paste-like sealing material 130 to the circumferential face of the pillar-shaped porous honeycomb member 15, although not particularly limited, for example, a method is proposed in which: the two end faces of the pillar-shaped porous honeycomb member 15 are supported at the axis and the pillar-shaped porous honeycomb member 15 is rotated around the rotation axis in the length direction so that the paste-like sealing material 130 is applied to or dripped onto the circumferential face of the pillar-shaped porous honeycomb member 15 so as to be adhered thereto.

In the above-mentioned sealing material applying step, although it is not necessary to apply the paste-like sealing material 130 to the entire circumferential face of the pillar-shaped porous honeycomb member 15, it is desirable to place an amount of the sealing material required for thinly coating the entire circumferential face when it is expanded to spread thereon, in a stripe pattern or in a state of lumps with appropriate intervals. This arrangement allows the sealing material paste layer 131 to spread thinly with an even thickness when the paste-like sealing material is expanded to spread over the entire circumferential face of the pillar-shaped porous honeycomb member 15 in the scraping step, which will be discussed later.

With respect to the paste-like sealing material 130 to be used in the sealing material applying step, not particularly limited, it is prepared by mixing, for example, an inorganic filler, an inorganic binder, an organic binder, a solvent, a foaming material, a resin, organic balloons and the like. Among these, those sealing materials containing an inorganic filler and an inorganic binder are desirably used, and those sealing materials containing an inorganic filler, an inorganic binder and an organic binder are more desirably used. This is because those sealing materials make it possible to provide a sealing material layer 13 having a superior thermal conductivity. Here, after the sealing material 130 has been dried and cured, the organic binder may be decomposed and eliminated. Moreover, in the present specification, the term, "balloons", is used as a concept including, so-called bubbles and hollow particles.

The above-mentioned inorganic filler is desirably designed such that each particle has not a completely spherical shape, but a flattened shape, and the aspect ratio of the inorganic filler is desirably set in a range from 1.01 to 10.00. Here, the above-mentioned expression, "the aspect ratio of the inorganic filler is set in a range from 1.01 to 10.00", refers to the fact that the number of the inorganic filler particles having an aspect ratio in a range from 1.01 to 10.00 accounts for 80% or more among the inorganic filler particles.

When the aspect ratio of the inorganic filler is set in the range from 1.01 to 10.00, the inorganic filler particles can be oriented so that a sealing material layer 13 that exerts a superior thermal conductivity and the like in the oriented direction can be obtained. In the case when the sealing material layer 13 has a superior thermal conductivity, upon using the honeycomb structural body as a filter in an exhaust gas purifying device and the like, it is possible to reduce a temperature difference in the length direction and consequently to reduce a difference in thermal expansion; thus, it becomes possible to prevent cracks from occurring in the sealing material layer 13. Moreover, by setting the aspect ratio in the range from 1.01 to 10.00, the viscosity of the sealing material 130 can be adjusted in an appropriate range so that it becomes possible to easily make the sealing material 130 adhered to the circumferential face of the pillar-shaped porous honeycomb member 15 and also to easily expand the sealing material 130 to thinly spread over the entire circumferential face of the pillar-shaped porous honeycomb member 15.

In the case when the aspect ratio of the inorganic filler is less than 1.01, since the inorganic filler can not be oriented, it becomes difficult to adjust the thermal conductivity of the resulting sealing material layer 13, the viscosity of the sealing material 130 and the like. In contrast, when the aspect ratio of the inorganic filler exceeds 10.00, the degree of orientation of the inorganic filler becomes too high; consequently, in the resulting sealing material layer 13, the thermal conductivity, and the like in directions other than the orientation direction of the inorganic filler becomes too low and it becomes difficult to expand the sealing material 130 to spread over the entire circumferential face of the pillar-shaped porous honeycomb member 15. The aspect ratio of the inorganic filler is desirably set in a range from 1.01 to 5.00, more desirably, in a range from 1.01 to 3.00.

With respect to the content of the inorganic filler in the sealing material, the lower limit value is desirably set to 75% by weight, and the upper limit value is desirably set to 95% by weight. The content of less than 75% by weight tends to result in an insufficient thermal conductivity in the sealing material. In contrast, the content exceeding 95% by weight tends to cause a reduction in the bonding strength in the sealing material and the subsequent insufficient thermal conductivity.

With respect to the material for the inorganic filler, inorganic particles, inorganic balloons, inorganic fibers and the like may be used.

Here, as described above, since the aspect ratio of the inorganic filler is desirably set in a range from 1.01 to 10.00, the sealing material 130 is desirably designed so as not to contain inorganic fibers. This is because the inorganic fibers have such a great aspect ratio in a range from 10 to 10000 that the effects, obtained by containing inorganic particles having an aspect ratio in a range from 1.01 to 10.00, tend to be cancelled.

Here, when no inorganic fibers are contained in the sealing material 130, inorganic particles, resin, balloons and the like are desirably contained therein.

With respect to the inorganic particles, examples thereof include particles of carbides and nitrides, and specific examples include inorganic powder or whiskers made from silicon carbide, silicon nitride, boron nitride and the like. Each of these may be used alone, or two or more kinds of these may be used in combination. Among those, silicon carbide having a superior thermal conductivity is desirably used.

The lower limit of the average particle diameter of the inorganic fine particles is desirably set to 0.01 $\mu$m, and the upper limit thereof is desirably set to 100 $\mu$m. The average particle size of less than 0.01 $\mu$m tends to result in high costs, while the average particle size exceeding 100 $\mu$m tends to cause a reduction in the bonding strength and thermal conductivity of the sealing material layer 13. The lower limit is more desirably set to 0.1 $\mu$m, most desirably, to 0.2 $\mu$m; in contrast, the upper limit is more desirably set to 1.5 $\mu$m, most desirably, to 10 $\mu$m.

With respect to the content of the inorganic particles in the sealing material, the lower limit thereof is desirably set to 3% by weight, and the upper limit thereof is desirably set to 80% by weight, on the solid component basis. The content of less than 3% by weight tends to cause degradation in the thermal conductivity of the sealing material layer 13; in contrast, the content exceeding 80% by weight tends to cause degradation in the bonding strength of the sealing material layer 13 when the sealing material layer 13 is exposed to high temperatures. The lower limit is more desirably set to 10% by weight, most desirably, to 20% by weight; in contrast, the upper limit is more desirably set to 60% by weight, most desirably, to 40% by weight.

With respect to the above-mentioned inorganic balloons, examples thereof include alumina balloons, glass micro-balloons, shirasu balloons, fly ash balloons (FA balloons), mullite balloons and the like.

With respect to the shape of the inorganic balloons, not particularly limited, examples thereof include any desired shapes, such as a spherical shape, an elliptical shape, a cubic shape, an undefined lump shape, a column shape, a plate shape and the like. In the case when the inorganic balloons have a spherical shape, the lower limit of the average particle diameter is desirably set to 30 $\mu$m, and the upper limit thereof is desirably set to 300 $\mu$m.

With respect to the content of the inorganic balloons in the sealing material, the lower limit thereof is desirably set to 40% by weight, and the upper limit thereof is desirably set to 70% by weight. The content of less than 40% by weight tends to make the thermal capacity too high and cause degradation in the viscosity, making it difficult to carry out the applying step. In contrast, the content exceeding 70% by weight tends to cause degradation in the viscosity, making it difficult to carry out the applying step.

With respect to the inorganic fibers, examples thereof include ceramic fibers, such as silica-alumina, mullite, alumina, silica and the like. Each of these may be used alone or two or more kinds of these may be used in combination. Among the inorganic fibers, silica-alumina fibers are more desirably used.

With respect to the shot content of the inorganic fibers, the lower limit thereof is desirably set to 1% by weight, and the upper limit thereof is desirably set to 10% by weight. Setting the content to less than 1% by weight is difficult in the production, and the content exceeding 10% by weight tends to cause damages to the wall face of the pillar-shaped porous honeycomb member 15. The upper limit is more desirably set to 5% by weight, most desirably, to 3% by weight.

With respect to the fiber length of the inorganic fibers, the lower limit thereof is desirably set to 5 $\mu$m, and the upper limit thereof is desirably set to 100 $\mu$m. The fiber length of less than 5 $\mu$m tends to fail to improve the elasticity of the sealing material layer 13. In contrast, the fiber length exceeding 100 $\mu$m tends to cause pilled-state fibers and the subsequent degradation indispersion of the inorganic particles, making it impossible to provide a thin sealing material layer 13. The lower limit is more desirably set to 10 $\mu$m, and the upper limit is more desirably set to 50 $\mu$m, most desirably, to 20 $\mu$m.

The content of the inorganic fibers in the sealing material 130 is desirably set to as small a value as possible, as described earlier, and the upper limit value thereof is desirably set to 70% by weight on the solid component basis. The content exceeding 70% by weight tends to make the viscosity of the sealing material 130 too high, and sometimes causes degradation in the effects as the elastic member. The upper limit value is more desirably set to 40% by weight, most desirably, to 30% by weight.

With respect to the inorganic binder, for example, silica sol, alumina sol and the like may be used. Each of these may be used alone or two or more kinds of these may be used in combination. Among the inorganic binders, silica sol is more desirably used.

With respect to the content of the inorganic binder in the sealing material 130, the lower limit thereof is desirably set to 1% by weight, and the upper limit thereof is desirably set to 30% by weight, on the solid component basis. The content of less than 1% by weight tends to cause degradation in the bonding strength of the sealing material layer 13; in contrast, the content exceeding 30% by weight tends to cause degradation in the thermal conductivity of the sealing material layer 13 when the sealing material layer 13 is exposed to high temperatures. The lower limit is more desirably set to 1% by weight, most desirably, to 5% by weight; in contrast, the upper limit is more desirably set to 15% by weight, most desirably, to 9% by weight.

With respect to the organic binder, examples thereof include polyvinyl alcohol, methyl cellulose, ethyl cellulose, carboxymethyl cellulose and the like. Each of these may be used alone or two or more kinds of these may be used in combination. Among the organic binders, carboxymethyl cellulose is more desirably used.

With respect to the content of the organic binder in the sealing material 130, the lower limit thereof is desirably set to 0.1% by weight, and the upper limit thereof is desirably set to 5.0% by weight, on the solid component basis. The content of less than 0.1% by weight tends to cause difficulty in suppressing migration of the sealing material layer 13; in contrast, the content exceeding 5.0% by weight tends to cause insufficient bonding strength in the sealing material layer 13 when the sealing material layer 13 is exposed to high temperatures so that the organic binder is burned and eliminated. The lower limit is more desirably set to 0.2% by weight, most desirably, to 0.4% by weight; in contrast, the upper limit is more desirably set to 1.0% by weight, most desirably, to 0.6% by weight.

With respect to the solvent, examples thereof include water, acetone, alcohol and the like.

The solvent, which is blended so as to provide sufficient flowability to the paste-like sealing material 130, is normally contained in a range from 35 to 65% by weight.

Moreover, the sealing material 130 may contain a foaming agent, resin, balloons and the like so that pores are formed inside the sealing material layer 13; thus, by adjusting the porosity of the sealing material layer 13 and the pore diameter in the sealing material layer 13, it becomes possible to adjust the coefficient of thermal expansion of the sealing material layer 13.

In the case when the honeycomb structural body 10 is used as an exhaust gas purifying filter and the like, since the sealing material layer 13 is heated to a high temperature, the above-mentioned organic components such as the organic binder, foaming agent, resin, organic balloons and the like, are decomposed and burned to be eliminated during the use; thus, pores are formed inside the sealing material layer 13. Although the inorganic balloons are allowed to remain inside the sealing material layer 13 even after the high-temperature heating process, the inorganic balloons, which hold gases inside thereof, can be used for adjusting the coefficient of thermal expansion of the sealing material layer 13.

With respect to the foaming material, not particularly limited as long as it is decomposed upon application of heat, examples thereof include ammonium hydrogencarbonate, ammonium carbonate, amyl acetate, butyl acetate, diazo amino benzene and the like.

With respect to the above-mentioned resin, not particularly limited, examples thereof include: thermoplastic resins such as acrylic resin, phenoxy resin, polyether sulfone, polysulfone and the like, and thermosetting resins such as epoxy resin, phenolic resin, polyimide resin, polyester resin, bismaleimide resin, polyolefin-based resin, polyphenylene ether resin and the like.

With respect to the shape of these resins, not particularly limited, examples thereof include desired shapes such as a spherical shape, an elliptical shape, a cube shape, an undefined lump shape, a column shape, a plate shape and the like.

In the case of the spherical shape of the resin, the lower limit of the average particle size is desirably set to 30 μm, and the upper limit thereof is desirably set to 300 μm.

With respect to the organic balloons, not particularly limited, for example, acrylic balloons and polyester balloons may be used.

The lower limit of the viscosity of the sealing material 130 is desirably set to 15 Pa·s, and the upper limit thereof is desirably set to 45 Pa·s. The viscosity of less than 15 Pa·s is too low; thus, it becomes difficult to let the sealing material 130 adhere to the pillar-shaped porous honeycomb member 15. In contrast, when the viscosity exceeds 45 Pa·s, the thickness of the sealing material layer 13 that is used for adjusting irregularities on the circumferential face of the honeycomb structural body 10 tends to have irregularities. The lower limit thereof is more desirably set to 25 Pa·s, and the upper limit thereof is more desirably set to 35 Pa·s.

Here, the viscosity of the sealing material can be measured at room temperature in compliance with JIS R 1652 "viscosity measuring method for ceramics slurry by the use of a rotary viscometer".

The pillar-shaped porous honeycomb member 15 to be used in the above-mentioned sealing material applying step will be described later.

In the manufacturing method of a honeycomb structural body according to the first aspect of the present invention, the scraping step is carried out after the above-mentioned sealing material applying step.

In the scraping steps a ring-shaped scraper 200, which is able to contact the circumferential face of the pillar-shaped porous honeycomb member 15 so as to slide thereon, is fitted to the pillar-shaped porous honeycomb member 15 and moved in the length direction thereof so that the paste-like sealing material 130, adhered to the circumferential face, is expanded to spread over the entire circumferential face. As shown in FIGS. 3(*b*) and 3(*c*), the ring-shaped scraper 200 moves to slide on the circumferential face of the ceramic block 15; thus, the paste-like sealing material 130 is expanded to spread into a thin film so that concave portions on the circumferential face are filled with the sealing material, while convex portions being coated thereon, to form a sealing material paste layer 131. Here, in FIG. 3(*b*), the arrow indicates the moving direction of the scraper 200.

In the above-mentioned fitting and moving process, the scraper 200 may be moved while the pillar-shaped porous honeycomb member 15 being secured (see FIG. 3(*b*)), or the pillar-shaped porous honeycomb member 15 may be moved while the scraper 200 being secured, or both of the members may be moved. Moreover, the fitting and moving process may be carried out only in one direction between the two ends of the pillar-shaped porous honeycomb member 15, or may be carried out in the both (reciprocating) directions.

Furthermore, after the scraping step, the sealing material applying step and scraping step may be again carried out repeatedly based on necessity. By repeating the sealing material applying step and the scraping step, the sealing material layer 13 can be formed on the entire circumferential face of the pillar-shaped porous honeycomb member 15 without irregularities.

In the scraping step of the manufacturing method of a honeycomb structural body according to the first aspect of the present invention, the ring-shaped scraper 200 is fitted to the pillar-shaped porous honeycomb member 15 and moved in the length direction so that the ring-shaped scraper 200 is separated from the end face of the pillar-shaped porous honeycomb member 15. For this reason, this arrangement prevents the paste-like sealing material 130 from forming a protruding separation trace on the circumferential face of the pillar-shaped porous honeycomb member 15, and since the scraping step is carried out by applying an almost uniform pressure onto the circumferential face, the sealing material paste layer 131 having a smooth surface can be formed on the peripheral portion of the pillar-shaped porous honeycomb member 15; thus, it becomes possible to prepare a honeycomb structural body 10 that is less likely to generate dispersion on the profile of the cross section perpendicular to the length direction. More specifically, the degree of profile of the honeycomb structural body 10 on which the sealing material paste layer 131 has been formed can be set to 0.7 mm or less. By setting the degree of profile of the ceramic structural body 10 to 0.7 mm or less, it becomes possible to increase the push-out strength by 20% or more when the resulting honeycomb structural body is placed and secured to an exhaust gas passage in an internal combustion engine through a holding sealing member, in comparison with a conventional honeycomb structural body the degree of profile of which is in a level of about 1.2 mm.

Here, the degree of profile of the honeycomb structural body, which serves as an index that indicates dispersion in the profile of the cross section perpendicular to the length direction of the honeycomb structural body, corresponds to a magnitude of a deviation at a portion in which the actual profile line has the greatest deviation from a geometrical profile line determined by the designed dimension.

The degree of profile of the honeycomb structural body 10 on which the sealing material paste layer 131 has been formed can be adjusted by the amount and the viscosity of the sealing material 130 to be adhered in the sealing material applying step and the sliding speed of the ring-shaped scraper 200 and the like.

Moreover, by adjusting the difference between the outer diameter of the pillar-shaped porous honeycomb member 15 and the inner diameter of the ring-shaped scraper 200, it becomes possible to easily make the thickness of the sealing material paste layer 131, which has been conventionally set to about 1.0 mm, thinner.

The thickness of the sealing material paste layer 131 is desirably made as thin as possible as long as it is capable of preventing leak of exhaust gases from the peripheral portion of the honeycomb structural body 10. By making the thickness of the sealing material paste layer 131 thinner, the thickness of the sealing material layer 13 after a curing process can be made thinner, and the aperture ratio of the two end faces of the resulting honeycomb structural body 10 can be made greater; thus, it becomes possible to reduce the pressure loss when the resulting honeycomb structural body 10 is placed at an exhaust passage in an internal combustion engine. More specifically, the upper limit is desirably set to 0.1 mm, and the lower limit is desirably set to 0.05 mm.

Moreover, manufacturing processes for the honeycomb structural body 10 are continuously carried out by using the scraper 200 having a fixed shape so that, even when each of the pillar-shaped porous honeycomb members 15 has dispersion in its external dimension, a honeycomb structural body having a desired external dimension corresponding to the shape of the scraper 200 is always manufactured.

Since the ring-shaped scraper 200 is fitted to the pillar-shaped porous honeycomb member 15 and moved in the length direction to form the sealing material paste layer 131, the inorganic filler in the sealing material paste layer 131 is oriented in the length direction of the pillar-shaped porous honeycomb member 15 so that it becomes possible to provide a sealing material layer 13 that has a superior thermal conductivity and the like in the length direction of the pillar-shaped porous honeycomb member, and consequently to prevent cracks from occurring in the honeycomb structural body.

Figure 4A:
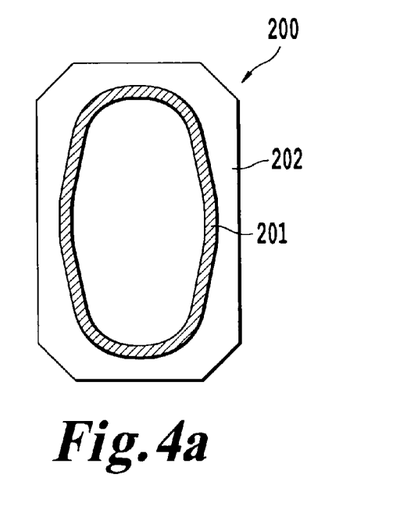
FIG. 4(a) is a plan view that schematically shows one example of a scraper to be used in the manufacturing method of the honeycomb structural body of the present invention.
Figure 4B:
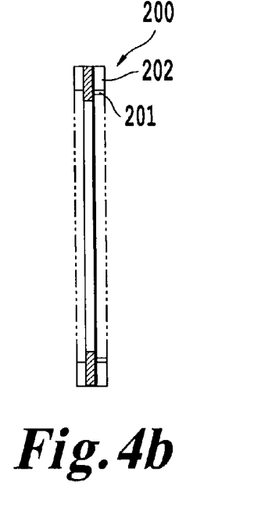
FIG. 4(b) is a cross-sectional view of the scraper shown in FIG. 4(a).

FIG. 4(a) is a plan view that schematically shows one example of a scraper to be used in the manufacturing method of a honeycomb structural body according to the first aspect of the present invention, and FIG. 4(b) is a cross-sectional view of the scraper shown in FIG. 4(a).

As shown in FIG. 4, the scraper 200 has a structure in which a ring-shaped center member 201, which has an inner diameter capable of contacting the circumferential face of the pillar-shaped porous honeycomb member 15 so as to slide thereon, is cramped by ring-shaped cramping members 202 having an inner diameter greater than the ring-shaped center member 201, and the center member 201 is made from a material that is softer than the material of the pillar-shaped porous honeycomb member 15, with the cramping members 202 being made from a material harder than the center member 201. With this arrangement, when the center member 201 is made in contact with the circumferential face of the pillar-shaped porous honeycomb member 15, it is possible to prevent the pillar-shaped porous honeycomb member 15 from being damaged, and consequently to improve the strength of the scraper 200 by the use of the cramping members 202; thus, it becomes possible to prevent the scraper 200 from being deformed.

With respect to the material for the center member 201, not particularly limited, examples thereof include synthetic rubbers such as urethane rubber, styrene-butadiene rubber, butadiene rubber, isoprene rubber, chloroprene rubber, silicone rubber and the like, and elastomers such as polyisobutylene, polyethylene and the like. Among these, urethane rubber is more desirably used. Since urethane rubber has appropriate mechanical strength, it is less likely to generate deformation upon fitting and moving process so that it becomes possible to reduce dispersion in the profile of the resulting honeycomb structural body 10, and urethane is not so hard that it is possible to avoid giving damages to the pillar-shaped porous honeycomb member 15 at the time of contacting.

The lower limit of the thickness of the center member 201 is desirably set to 1.0 mm, and the upper limit thereof is desirably set to 5.0 mm. The thickness of less than 1.0 mm makes the pressure exerted upon contacting the pillar-shaped porous honeycomb member 15 too low, resulting in irregularity in the thickness of the sealing material paste layer 131. In contrast, the thickness exceeding 5.0 mm makes the above-mentioned pressure too high; thus, the thickness of the sealing material paste layer 131 becomes too thin, resulting in uncoated portions with respect to the sealing material paste on the circumferential face of the pillar-shaped porous honeycomb member 15.

With respect to the material for the cramping member 202, not particularly limited, examples thereof include resins, such as fluorine resin, polyimide resin, polyamide, polyphenylene oxide and the like, and metals such as SUS and the like.

Here, with respect to the shape of the scraper to be used in the scraping step, not particularly limited to the shape shown in FIG. 4, any desired shape such as a ring shape, an elliptical ring shape, an elongated ring shape, a polygonal annular shape and the like may be used in accordance with the profile of the circumferential face of the pillar-shaped porous honeycomb member, as long as it is a ring shape capable of contacting the circumferential face of the pillar-shaped porous honeycomb member so as to slide thereon.

Moreover, with respect to the structure of the scraper to be used in the scraping step, not limited to the structure shown in FIG. 4, for example, a member, which is formed by bonding a thin elastic member to the inner circumferential side to have a contact with the pillar-shaped porous honeycomb member, may be used.

In the manufacturing method of a honeycomb structural body according to the first aspect of the present invention, next, the sealing material paste layer 131 is dried at a temperature of about 120° C. so that the solvent is evaporated to form a sealing material layer 13; thus, the manufacturing processes for forming the honeycomb structural body 10 in which the sealing material layer 13 is formed on the peripheral portion of the pillar-shaped porous honeycomb member 15 are finished.

Here, in the above-mentioned scraping step, upon drawing the scraper 200 from the pillar-shaped porous honeycomb member 15, in the case when the paste-like sealing material 130 pulls strings to form protruding separation traces on the end face of the sealing material paste layer 131 on the side of the pillar-shaped porous honeycomb member 15, it is desirable to remove the separation traces. The removing process of the separation traces may be carried out before the drying process of the sealing material, or after the drying process of the sealing material.

The following description will discuss the above-mentioned pillar-shaped porous honeycomb member to be used in the manufacturing method of a honeycomb structural body according to the first aspect of the present invention.

Upon manufacturing a honeycomb structural body to be used as a particulate-collecting filter for use in an exhaust gas purifying device and the like, the pillar-shaped porous honeycomb member is normally made from porous ceramics, and formed as a pillar-shaped body in which a number of through holes 31 are placed side by side in the length direction with a partition wall 33 being interpolated in between, as shown in FIG. 2. Each of the through holes 31 has either of its ends on the inlet-side or outlet-side of exhaust gases sealed with a plug 32, and the partition wall is made from porous ceramics or the like.

The above-mentioned pillar-shaped porous honeycomb member may have an integrally molded structure, or may be formed by combining a plurality of pillar-shaped porous honeycomb small-size members with one another through a sealing material layer. Here, in the case when the pillar-shaped porous honeycomb member is made from a ceramic material such as silicon carbide having a great coefficient of thermal expansion, the pillar-shaped porous honeycomb member is expanded and shrunk greatly due to temperature rises and temperature drops during the use of the honeycomb structural body as a filter to cause cracks and the like in the honeycomb structural body, resulting in a failure in functioning as the particulate-collecting filter; therefore, the pillar-shaped porous honeycomb member is desirably allowed to have a divided structure. With this arrangement, the expansion and shrinkage in each of the pillar-shaped porous honeycomb small-size members due to temperature changes can be absorbed by the sealing material layer so that it becomes possible to prevent cracks and the like from occurring in the honeycomb structural body. Here, the sealing material layer, used for combining the pillar-shaped porous honeycomb small-size members with one another, is desirably prepared as a bonding agent layer having a bonding function.

With respect to the cross-sectional shape perpendicular to the length direction of the pillar-shaped porous honeycomb member, not particularly limited, any desired shape such as a round shape, an elliptical shape, an elongated round shape, a polygonal shape and the like may be used. In particular, shapes other than the round shape are desirably used. In the case when the cross-sectional shape perpendicular to the length direction of the pillar-shaped porous honeycomb member is allowed to have a shape other than a round shape, the conventional manufacturing method of a honeycomb structural body needs to move a scraper; thus, the pressing force of the scraper tends to become uneven, resulting in irregularities in the thickness of the sealing material layer and the subsequent difficulty in forming a honeycomb structural body having a high degree of profile; however, according to the manufacturing method according to the first aspect of the present invention, it becomes possible to manufacture a honeycomb structural body having a high degree of profile irrespective of the cross-sectional shapes.

Upon manufacturing the pillar-shaped porous honeycomb member made from porous ceramics, first, a material paste, which contains ceramic powder, a binder, a dispersant, a molding assistant, a pore-forming agent and the like, is prepared, and an extrusion-molding process is carried out by using this material paste so that a ceramic formed body having almost the same shape as the pillar-shaped porous honeycomb member is formed.

With respect to the material for the ceramic powder, not particularly limited, examples thereof include: nitride ceramics such as aluminum nitride, silicon nitride, boron nitride, titanium nitride and the like; carbide ceramics such as silicon carbide, zirconium carbide, titanium carbide, tantalum carbide, tungsten carbide and the like; and oxide ceramics such as alumina, zirconia, cordierite, mullite, aluminum titanate and the like. Among these, oxide ceramics such as cordierite, silicon carbide and the like are desirably used. The oxide ceramics such as cordierite and the like make it possible to cut manufacturing costs, and these materials have a comparatively small coefficient of thermal expansion, and are less susceptible to oxidation during use. Moreover, the silicon carbide has superior heat resistance and mechanical properties, and also has a high thermal conductivity. Here, metal silicon powder may be mixed with the ceramic powder made from the above-mentioned material.

After the above-mentioned ceramic formed body has been dried by using a drier, a sealing material paste (plug) having almost the same composition as the material paste, which will form plugs, is injected into predetermined through holes so that the through holes are sealed.

Lastly, the ceramic dried body that has been filled with the sealing material paste (plug) is subjected to degreasing and sintering processes under predetermined conditions so that a pillar-shaped porous honeycomb member, which is made of porous ceramics, and formed as a single sintered body as a whole, is manufactured.

Moreover, in the case when the above-mentioned pillar-shaped porous honeycomb member is constituted by a plurality of pillar-shaped porous honeycomb small-size members combined with one another through a sealing material layer, after a plurality of pillar-shaped porous honeycomb small-size members having a rectangular pillar shape have been manufactured by using, for example, the same method as described above, the pillar-shaped porous honeycomb small-size members are combined with one another through sealing material so that a laminated body of the pillar-shaped porous honeycomb small-size members, having a rectangular pillar shape with a predetermined size, is manufactured.

Next, the laminated body of the pillar-shaped porous honeycomb small-size members is heated so that the sealing material is dried and solidified to form sealing material layer; thereafter, by cutting the peripheral portion into a predetermined shape by using a diamond cutter or the like so that a pillar-shaped porous honeycomb member, constituted by a plurality of pillar-shaped porous honeycomb small-size members combined with one another through the sealing material layer, can be manufactured.

Incidentally, when a catalyst capable of purifying CO, HC, NOx and the like in the exhaust gases is supported thereon, the pillar-shaped porous honeycomb member 15 is allowed to function as a honeycomb structural body capable of collecting particulates in exhaust gases, and also to function as a catalyst converter for purifying CO, HC, NOx and the like contained in exhaust gases.

With respect to the catalyst to be supported on the pillar-shaped porous honeycomb member 15 when it is used as a catalyst converter, although not particularly limited as long as the catalyst can purify CO, HC, NOx and the like in exhaust gases, examples thereof include noble metals such as platinum, palladium, rhodium and the like. The catalyst, made from a noble metal such as platinum, palladium, rhodium and the like, is a so-called three-way catalyst, and the pillar-shaped porous honeycomb member 15 which is provided with such a three-way catalyst is allowed to function in the same manner as conventionally known catalyst converters. Therefore, with respect to the case in which the pillar-shaped porous honeycomb member 15 also functions as a catalyst converter, detailed description thereof is omitted.

The above-mentioned catalyst may be supported on the surface of each of pores inside the partition wall 33, or may be supported on the surface of each of the partition wall 33 with a certain thickness. Moreover, the above-mentioned catalyst may be supported on the surface of each of pores inside the partition wall 33 and/or the surface of each of the partition wall 33 evenly or may be supported on a certain place thereof in a biased manner.

As described above, in the manufacturing method of a honeycomb structural body according to the first aspect of the present invention, upon forming a sealing material layer on the peripheral portion of a pillar-shaped porous honeycomb member, the surface of the sealing material layer prior to a curing process is formed by using a ring-shaped scraper capable of contacting the circumferential face of the pillar-shaped porous honeycomb member so as to slide thereon; therefore, it is possible to prevent a protruding separation trace from being formed on one portion of the sealing material layer on the circumferential face, and also to prevent dispersion in the thickness of the sealing material layer from occurring due to unevenness of the pressing force by the scraper; consequently, it becomes possible to manufacture a honeycomb structural body that is less likely to generate dispersion on the profile of the cross section perpendicular to the length direction, with a superior assembling property.

Moreover, in the manufacturing method of a honeycomb structural body according to the first aspect of the present invention, by adjusting the difference between the outer diameter of the pillar-shaped porous honeycomb member and the inner diameter of the ring-shaped scraper, the thickness of the sealing material layer can be made thinner; therefore, it becomes possible to make the aperture ratio of the two end faces of the resulting honeycomb structural body greater, and consequently to reduce the pressure loss when the resulting honeycomb structural body is placed in an exhaust passage in an internal combustion engine.

Furthermore, the manufacturing processes of the honeycomb structural body can be continuously carried out by using a scraper with a fixed shape so that, even in the case when each of the pillar-shaped porous honeycomb members has dispersion in its external dimension, it is always possible to manufacture a honeycomb structural body having a desired external dimension that corresponds to the shape of the scraper.

A sealing material according to the second aspect of the present invention, which is used in the manufacturing method of a honeycomb structural body of the first aspect of the present invention, has its viscosity being set in a range from 15 to 45 Pa·s.

According to the sealing material of the second aspect of the present invention, since the viscosity is set in a range from 15 to 45 Pa·s, the sealing material can be expanded to spread as a very thin film over the entire circumferential face of the pillar-shaped porous honeycomb member by the scraper; therefore, it is possible to manufacture a honeycomb structural body which is less likely to generate dispersion on the profile of the cross section perpendicular to the length direction, with a superior assembling property, and has a reduced pressure loss when it is placed in an exhaust passage in an internal combustion engine.

The sealing material according to the second aspect of the present invention is the same as the sealing material that has been explained as the paste-like sealing material 130 to be used in the sealing material applying step in the manufacturing method of a honeycomb structural body according to the first aspect of the present invention, except that its viscosity is specified in a range from 15 to 45βa·s; therefore, the description thereof is omitted.

A sealing material according to the third aspect of the present invention, which is used in the manufacturing method of a honeycomb structural body in which a sealing material layer is formed on the peripheral portion of a pillar-shaped porous honeycomb structural body, contains an inorganic filler and an inorganic binder, and is specified in that the inorganic filler has an aspect ratio in a range from 1.01 to 10.00.

In other words, the sealing material of the third aspect of the present invention may be used as a sealing material 130 to be used in the manufacturing method of a honeycomb structural body of the first aspect of the present invention, and in the case when it is used upon manufacturing a honeycomb structural body in which a sealing material layer is formed on the peripheral portion of a pillar-shaped porous honeycomb member, the sealing material may be used in a manufacturing method of a honeycomb structural body other than the manufacturing method of a honeycomb structural body of the first aspect of the present invention.

According to the sealing material of the third aspect of the present invention, by adjusting the coating method and orienting the inorganic filler, it is possible to provide a sealing material layer having a superior thermal conductivity in the oriented direction, and consequently to manufacture a honeycomb structural body that is less likely to generate cracks, and has superior durability. Moreover, since the viscosity can be adjusted to an appropriate range, it is possible to easily form a sealing material layer that is thin with an even thickness and is superior in handling property.

The sealing material according to the third aspect of the present invention has the same composition as the sealing material that has been explained as the paste-like sealing material 130 to be used in the sealing material applying step in the manufacturing method of a honeycomb structural body according to the first aspect of the present invention, except that it contains an inorganic filler and an inorganic binder, and is specified in that the inorganic filler has an aspect ratio in a range from 1.01 to 10.00; therefore, the description thereof is omitted.

EXAMPLES

The following description will discuss the present invention in detail by means of examples; however, the present invention is not intended to be limited by these examples.

Example 1

(1) Powder of α-type silicon carbide having an average particle size of 10 μm (60% by weight) and powder of β-type silicon carbide having an average particle size of 0.5 μm (40% by weight) were wet-mixed, and to 100 parts by weight of the resulting mixture were added and kneaded 5 parts by weight of an organic binder (methyl cellulose) and 10 parts by weight of water to obtain a mixed composition. Next, after a slight amount of a plasticizer and a lubricant had been added and kneaded therein, the resulting mixture was extrusion-molded so that a raw formed body having a square-pillar shape, which had almost the same cross-sectional shape as the cross-sectional shape shown in FIG. 2, was manufactured. Next, after the above-mentioned raw formed body had been dried by using a microwave drier or the like to form a ceramic dried body, predetermined through holes were filled with a sealing material paste (plug) having the same composition as the raw formed body. After having been again dried by using a drier, the resulting product was degreased at 400° C., and sintered at 2200° C. in a normal-pressure argon atmosphere for 3 hours to manufacture a pillar-shaped porous honeycomb small-size member, which was a silicon carbide sintered body, and had a porosity of 42%, an average pore diameter of 9 μm, a size of 34.3 mm×34.3 mm×150 mm, the number of through holes of 28 pcs/cm² and a thickness of almost all the partition wall of 0.4 mm.

(2) By using a heat resistant adhesive paste containing 30% by weight of alumina fibers having a fiber length of 20 μm, 21% by weight of silicon carbide particles having an average particle size of 0.6 μm, 15% by weight of silica sol, 5.6% by weight of carboxymethyl cellulose and 28.4% by weight of water, a large number of the pillar-shaped porous honeycomb small-size members were combined with one another, and this was then cut by using a diamond cutter to manufacture a cylindrical porous honeycomb member having a size of 143.7 mm in diameter×150 mm in length. In this case, the thickness of the adhesive layers used for combining the pillar-shaped porous honeycomb small-size members was adjusted to 1.0 mm.

(3) Next, silicon carbide powder (300 parts by weight) having an average particle size of 0.3 μm and an average aspect ratio of 1.5, which served as inorganic particles, silica sol ($SiO_2$ content in the sol: 30% by weight) (100 parts by weight), which served as an inorganic binder, carboxymethyl cellulose (10 parts by weight), which served as an organic binder, alumina balloons (400 parts by weight), which served as inorganic balloons, and water (100 parts by weight) were mixed and kneaded to prepare a paste-like sealing material having a viscosity of 25 Pa·s was prepared.

Next, the two end faces of the pillar-shaped porous honeycomb member were supported at the axis, and the pillar-shaped porous honeycomb member was rotated around the rotation axis in the length direction so that the sealing material was dripped onto the circumferential face of the pillar-shaped porous honeycomb member with appropriate intervals in a striped pattern and adhered thereto.

(4) Next, the pillar-shaped porous honeycomb member having the circumferential face with the sealing material adhered thereto was fixedly secured, and a scraper having a ring shape with an inner diameter of 143.8 mm, made of urethane rubber, was fitted to the pillar-shaped porous honeycomb member and moved at a speed of 100 mm/min in the length direction thereof so that the sealing material was pushed on and expanded over the entire circumferential face to form a sealing material paste layer.

Moreover, the sealing material was again made adhere in the same manner as described above, and the scraping step was carried out. In the second scraping step, the scraper was fitted and moved through, starting from the end face of the pillar-shaped porous honeycomb member on the side opposite to the starting side of the first scraping step.

Lastly, the sealing material paste layer was dried at 120° C. to form a sealing material layer having a thickness of 0.05 mm so that a cylindrical ceramic structural body having a size of 143.8 mm in diameter×150 mm in length was manufactured.

Examples 2 to 11, Comparative Examples 1 and 2

The same processes as those of Example 1 were carried out except that the composition of the sealing material was changed as indicated by the following Table 1 so that a cylindrical ceramic structural body having a size of 143.8 mm in diameter×150 mm in length was manufactured.

Here, in Comparative Examples 1 and 2, ceramic fibers made from alumina silicate (shot content: 3%, fiber length: 5 to 100 μm) were used as the inorganic fibers.

Example 12

(1) The same processes as those of Example 1 were carried out to manufacture a pillar-shaped porous honeycomb small-size member, which was a silicon carbide sintered body, and had a porosity of 42%, an average pore diameter of 9 μm, a size of 34.3 mm×34.3 mm×150 mm, the number of through holes of 28 pcs/cm² Åd a thickness of almost all the partition wall of 0.4 mm.

(2) Next, by using a heat resistant adhesive paste having the same composition as that of Example 1, a large number of the pillar-shaped porous honeycomb small-size members were combined with one another, and this was then cut by using a diamond cutter to manufacture an elliptical cylindrical porous honeycomb member having a size of 143.7 mm in major diameter×71.8 mm in minor diameter×150 mm in length. In this case, the thickness of the adhesive layers used for combining the pillar-shaped porous honeycomb small-size members was adjusted to 1.0 mm.

(3) Next, the two end faces of the pillar-shaped porous honeycomb member were supported at the axis, and the pillar-shaped porous honeycomb member was rotated around the rotation axis in the length direction so that the sealing material having the same composition as that of Example 1 was dripped onto the circumferential face of the pillar-shaped porous honeycomb member with appropriate intervals in a striped pattern and adhered thereto.

(4) Next, the pillar-shaped porous honeycomb member having the circumferential face with the sealing material adhered thereto was fixedly secured, and a scraper having a size of 143.8 mm in major diameter×71.9 mm in minor diameter, made of elliptical ring-shaped urethane rubber, was fitted to the pillar-shaped porous honeycomb member and moved at a speed of 100 mm/min in the length direction thereof so that the sealing material was pushed on and expanded over the entire circumferential face to form a sealing material paste layer.

Moreover, the sealing material was again made adhere in the same manner as described above, and the scraping step was carried out. In the second scraping step, the scraper was fitted and moved through, starting from the end face of the pillar-shaped porous honeycomb member on the side opposite to the starting side of the first scraping step.

Lastly, the sealing material paste layer was dried at 120° C. to form a sealing material layer having a thickness of 0.05 mm so that an elliptical cylindrical ceramic structural body having a size of 143.8 mm in major diameter×71.9 mm in minor diameter×150 mm in length was manufactured.

Reference Example 3

(1) The same processes as those of Example 1 were carried out to manufacture a cylindrical pillar-shaped porous honeycomb member having a size of 143.7 mm in diameter×150 mm in length.

(2) Next, the two end faces of the pillar-shaped porous honeycomb member were supported at the axis, and the pillar-shaped porous honeycomb member was rotated around the rotation axis in the length direction at a speed of 100 mm/min so that the sealing material having the same composition as that of Example 1 was dripped onto the circumferential face of the pillar-shaped porous honeycomb member with appropriate intervals in a striped pattern and adhered thereto, and a plate-shaped scraper, which was maintained at a fixed angle with respect to the circumferential face of the pillar-shaped porous honeycomb member, was used to spread the paste-like sealing material over the entire circumferential face as thinly as possible with an even thickness to form a sealing material paste layer.

Lastly, the sealing material paste layer was dried at 120° C. to form a sealing material layer having a thickness of 1.0 mm so that a cylindrical ceramic structural body having a size of 143.8 mm in diameter×150 mm in length was manufactured.

Comparative Example 1

The same processes as those of Reference Example 3 were carried out except that a sealing material having the same composition as that of Reference Example 1 was used so that a cylindrical ceramic structural body having a size of 143.8 mm in diameter×150 mm in length was manufactured.

(Evaluation 2) Degree of Profile of Honeycomb Structural Body

The degree of profiles of the honeycomb structural body according to each of the examples, reference examples and comparative examples were measured by using a three-dimensional measuring device (BH-V507, made by Mitsutoyo Corp.).

(Evaluation 3) Aspect Ratio of Inorganic Filler in Sealing Material Layer

Each of the honeycomb structural bodies according to examples, reference examples and comparative examples was cut, and the cross section was observed by using an SEM so that the aspect ratio of the inorganic filler contained in the sealing material layer was measured.

(Evaluation 4) Thermal Impact Test

Figure 7:
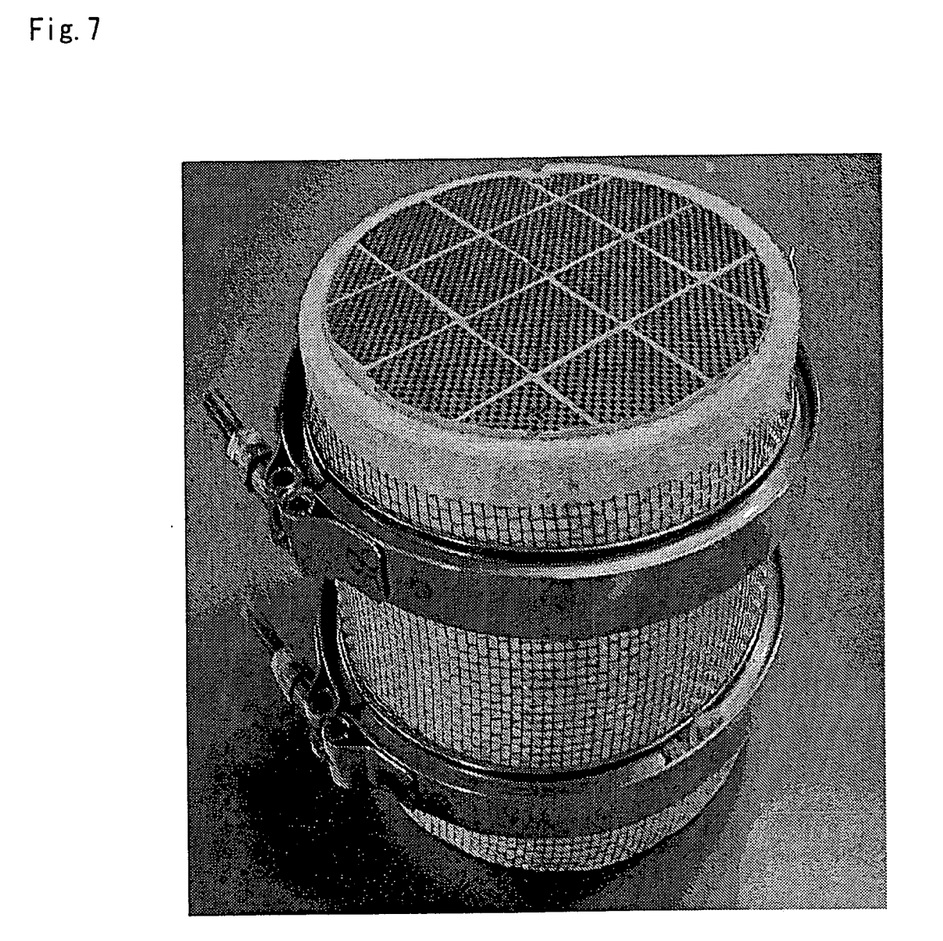
FIG. 7 is a photograph that shows one example of a sample for use in a thermal impact test.

The honeycomb structural bodies according to each of the examples, reference examples and comparative examples were wrapped into a round shape with a heat-insulator mat made from alumina fibers with a thickness of 7 mm (MAFTEC, made by Mitsubishi Chemical Corp.), and fastened by a metal net and a band to be secured so that the heat insulator mat might not open; thus, a sample for use in thermal impact tests was prepared (see FIG. 7).

TABLE 1

| | | Inorganic filler | | | | | | | |
|---|---|---|---|---|---|---|---|---|---|
| | | Inorganic particles (SiC powder) | | Inorganic balloons (Alumina) | | Inorganic fibers | | Inorganic binder | Organic binder | Water |
| | Scraper to be used | Aspect ratio | Blending amount (parts by weight) | Aspect ratio | Blending amount (parts by weight) | Aspect ratio | Blending amount (parts by weight) | Blending amount (parts by weight) | Blending amount (parts by weight) | Blending amount (parts by weight) |
| Example 1 | Ring Shape | 1.5 | 300 | 1.01 to 2 | 400 | — | 0 | 100 | 10 | 100 |
| Example 2 | Ring Shape | 2.5 | 300 | 2 to 3 | 400 | — | 0 | 100 | 10 | 100 |
| Example 3 | Ring Shape | 3.5 | 300 | 3 to 4 | 400 | — | 0 | 100 | 10 | 100 |
| Example 4 | Ring Shape | 4.5 | 300 | 4 to 5 | 400 | — | 0 | 100 | 10 | 100 |
| Example 5 | Ring Shape | 5.5 | 300 | 5 to 6 | 400 | — | 0 | 100 | 10 | 100 |
| Example 6 | Ring Shape | 6.5 | 300 | 6 to 7 | 400 | — | 0 | 100 | 10 | 100 |
| Example 7 | Ring Shape | 7.5 | 300 | 7 to 8 | 400 | — | 0 | 100 | 10 | 100 |
| Example 8 | Ring Shape | 9.5 | 300 | 9 to 10 | 400 | — | 0 | 100 | 10 | 100 |
| Example 9 | Ring Shape | 2.0 | 300 | 1.01 to 3 | 400 | — | 0 | 100 | 10 | 100 |
| Example 10 | Ring Shape | 2.5 | 300 | 1.01 to 4 | 400 | — | 0 | 100 | 10 | 100 |
| Example 11 | Ring shape | 3.0 | 300 | 1.01 to 5 | 400 | — | 0 | 100 | 10 | 100 |
| Example 12 | Elliptical ring shape | 1.5 | 300 | 1.01 to 2 | 400 | — | 0 | 100 | 10 | 100 |
| Reference Example 1 | Ring shape | 3.0 | 21 | — | 0 | 1 to 10000 | 30 | 15 | 5 | 100 |
| Reference Example 2 | Ring shape | 20 | 21 | — | 0 | 10 to 100 | 30 | 15 | 5 | 100 |
| Reference Example 3 | Plate shape | 1.5 | 300 | 1.01 to 2 | 400 | — | 0 | 100 | 10 | 100 |
| Comparative Example 1 | Plate shape | 3.0 | 21 | — | 0 | 1 to 10000 | 30 | 15 | 5 | 100 |

The honeycomb structural bodies according to the respective examples, reference examples and comparative examples were subjected to evaluation tests by using the following methods, and the results are shown in Table 2.

(Evaluation 1) Observation on Surface of Peripheral Sealing Material Layer

The circumferential faces made of the sealing material layer of the honeycomb structural body according to each of the examples, reference examples and comparative examples were visually observed so as to confirm whether or not any irregularities were present on the circumferential face.

Then, a sample for use in thermal impact tests was subjected to a thermal impact test in which it was heated in an electric furnace at a temperature-raising rate of 10° C./min, and maintained at the highest temperature for 30 minutes, and then quickly cooled to room temperature (20° C.). The thermal impact test was carried out several times, with the highest temperature being changed by 10° C. each time, to find test conditions that would cause cracks in the sealing material layer of the honeycomb structural body; thus, the highest temperature under the test conditions was defined as the endurance temperature of the honeycomb structural body.

TABLE 2

| | Sealing material layer on circumferential face | Degree of profile (mm) | Aspect ratio of inorganic filler in sealing material layer | Thermal impact test Temperature resistance (° C.) |
|---|---|---|---|---|
| Example 1 | No irregularities | 0.5 | 1.01 to 2 | 550 |
| Example 2 | No irregularities | 0.5 | 2 to 3 | 650 |
| Example 3 | No irregularities | 0.5 | 3 to 4 | 630 |
| Example 4 | No irregularities | 0.5 | 4 to 5 | 610 |
| Example 5 | No irregularities | 0.5 | 5 to 6 | 600 |
| Example 6 | No irregularities | 0.5 | 6 to 7 | 580 |
| Example 7 | No irregularities | 0.5 | 7 to 8 | 560 |
| Example 8 | No irregularities | 0.5 | 9 to 10 | 540 |
| Example 9 | No irregularities | 0.5 | 1.01 to 3 | 600 |
| Example 10 | No irregularities | 0.5 | 1.01 to 4 | 630 |
| Example 11 | No irregularities | 0.5 | 1.01 to 5 | 630 |
| Example 12 | No irregularities | 0.5 | 1.01 to 2 | 560 |
| Reference Example 1 | No irregularities | 0.7 | 1 to 10000 | 500 |
| Reference Example 2 | No irregularities | 0.7 | 10 to 100 | 520 |
| Reference Example 3 | With irregularities | 1.0 | 1.01 to 2 | 500 |
| Comparative Example 1 | With irregularities | 1.2 | 1 to 10000 | 480 |

As shown in Table 2, the honeycomb structural bodies according to Examples 1 to 12 and Reference Examples 1 and 2, which were manufactured by using a ring-shaped scraper, had no irregularities on the circumferential face, with a low level in the degree of profile, and were less likely to generate dispersion in the profile on the cross section perpendicular to the length direction. Moreover, the honeycomb structural bodies according to Examples 1 to 12 and Reference Example 3, which had an aspect ratio of the inorganic filler in the sealing material layer in a range from 1.01 to 10, had a high temperature resistance in the thermal impact test.

EXPLANATION OF SYMBOLS

| | |
|---|---|
| 10, 54 | Honeycomb structural body |
| 13, 52 | Sealing material layer |
| 14 | Adhesive layer |
| 15, 50 | Pillar-shaped porous honeycomb member |
| 30 | Pillar-shaped porous honeycomb small-size member |
| 31 | Through hole |
| 32 | Plug |
| 33 | Partition wall |
| 51 | Plate-shaped scraper |
| 53 | Separation portion |
| 130 | Paste-like sealing material |
| 131 | Sealing material paste layer |
| 200 | Ring-shaped scraper |
| 201 | Center member |
| 202 | Cramping member |

The invention claimed is:

1. A method of manufacturing a honeycomb structural body, comprising:

preparing a pillar-shaped porous honeycomb member;

applying a sealing material in an uncured paste state onto a circumferential surface of the pillar-shaped porous honeycomb member;

fitting onto the circumferential surface of the pillar-shaped porous honeycomb member a ring-shaped scraper having a ring-shaped center member configured to make a contact with the circumferential surface of the pillar-shaped porous honeycomb member such that the ring-shaped center member makes the contact with the circumferential surface of the pillar-shaped porous honeycomb member and applies a sufficient pressure on the circumferential surface of the pillar-shaped porous honeycomb member to scrape the sealing material and forms a sealing material layer on the circumferential surface of the pillar-shaped porous honeycomb member while sliding along the circumferential surface of a pillar-shaped porous honeycomb member;

moving said ring-shaped scraper in a length direction of the pillar-shaped porous honeycomb member from one end of the pillar-shaped porous honeycomb member such that the ring-shaped center member is separated from the circumferential surface of the pillar-shaped porous honeycomb member and the sealing material is spread over the circumferential surface of said pillar-shaped porous honeycomb member; and moving said ring-shaped scraper in the length direction of the pillar-shaped porous honeycomb member from an opposite end of the pillar-shaped porous honeycomb member such that the moving of said ring-shaped scraper is reversed.

2. The manufacturing method according to claim 1, wherein the pillar-shaped porous honeycomb member has a cross-sectional shape perpendicular to the length direction which is other than a round shape.

3. The method according to claim 1, wherein the ring-shaped center member is made of a material that is softer than a material of said pillar-shared porous honeycomb member.

4. The method according to claim 1, wherein a viscosity of said sealing material is in a range from 15 to 45 Pa·s.

5. The method according to claim 1, wherein said sealing material comprises an inorganic filler and an inorganic binder, and said inorganic filler has an aspect ratio in a range from 1.01 to 10.00.

6. The method according to claim 1, wherein the ring-shaped scraper comprises a plurality of cramping members having a flat ring shape and configured to hold the ring-shaped center member between the cramping members.

7. The method according to claim 1, wherein the ring-shaped center member has a thickness which applies the sufficient pressure on the circumferential surface of the pillar-shaped porous honeycomb member.

8. The method according to claim 1, wherein the ring-shaped center member comprises a synthetic rubber.

9. The method according to claim 1, wherein the ring-shaped center member comprises a synthetic rubber selected from the group consisting of a urethane rubber, a styrene-butadiene rubber, a butadiene rubber, an isoprene rubber, a chloroprene rubber and a silicone rubber.

10. The method according to claim 1, wherein the ring-shaped center member comprises an elastomer.

11. The method according to claim 1, wherein the ring-shaped center member comprises an elastomer selected from the group consisting of polyisobutylene and polyethylene.

12. The method according to claim 1, wherein the ring-shaped center member comprises a urethane rubber.

* * * * *